US011143106B2

(12) United States Patent
Zelina et al.

(10) Patent No.: US 11,143,106 B2
(45) Date of Patent: Oct. 12, 2021

(54) COMBUSTION SECTION HEAT TRANSFER SYSTEM FOR A PROPULSION SYSTEM

(71) Applicant: General Electric Company, Schenectady, NY (US)

(72) Inventors: Joseph Zelina, Waynesville, OH (US); Sibtosh Pal, Mason, OH (US); Arthur Wesley Johnson, Cincinnati, OH (US); Clayton Stuart Cooper, Loveland, OH (US); Steven Clayton Vise, Loveland, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 72 days.

(21) Appl. No.: 16/675,787

(22) Filed: Nov. 6, 2019

(65) Prior Publication Data

US 2020/0088101 A1   Mar. 19, 2020

Related U.S. Application Data

(63) Continuation of application No. 15/623,773, filed on Jun. 15, 2017, now Pat. No. 10,495,001.

(51) Int. Cl.
| | |
|---|---|
| *F23R 7/00* | (2006.01) |
| *F02C 7/18* | (2006.01) |
| *F01D 9/02* | (2006.01) |
| *F02C 3/14* | (2006.01) |

(Continued)

(52) U.S. Cl.
CPC ............... *F02C 7/18* (2013.01); *F01D 1/24* (2013.01); *F01D 9/02* (2013.01); *F02C 3/145* (2013.01);

(Continued)

(58) Field of Classification Search
CPC ...... F23R 3/42; F23R 3/50; F23R 7/00; F02C 5/10; F02C 5/11; F02C 7/08; F02C 7/10; F02C 7/18; F02C 7/185; F02C 9/08; F02C 9/18; F02K 7/02
See application file for complete search history.

(56) References Cited

U.S. PATENT DOCUMENTS

| | | |
|---|---|---|
| 3,015,937 A | 1/1962 | Giliberty |
| 3,240,010 A | 3/1966 | Morrison et al. |

(Continued)

*Primary Examiner* — Todd E Manahan
*Assistant Examiner* — Todd N Jordan
(74) *Attorney, Agent, or Firm* — Venable LLP; Edward A. Kmett; Michele V. Frank

(57) ABSTRACT

The present disclosure is directed to a propulsion system including a wall defining a combustion chamber inlet, a combustion chamber outlet, and a combustion chamber therebetween, a nozzle assembly disposed at the combustion chamber inlet, the nozzle assembly configured to provide a fuel/oxidizer mixture to the combustion chamber, a turbine nozzle coupled to the wall and positioned at the combustion chamber outlet, wherein the turbine nozzle defines a cooling circuit within the turbine nozzle, and a casing positioned radially adjacent to the wall, wherein a channel structure is positioned between the casing and the wall, the channel structure in fluid communication with the cooling circuit within the turbine nozzle, and wherein a flowpath is formed between the wall and the casing, the flowpath in fluid communication from the cooling circuit at the turbine nozzle to the nozzle assembly to provide a flow of oxidizer to the thereto.

16 Claims, 6 Drawing Sheets

(51) Int. Cl.
*F23R 3/00* (2006.01)
*F02C 7/10* (2006.01)
*F01D 1/24* (2006.01)
*F23R 3/28* (2006.01)
*F01D 25/12* (2006.01)
*F23R 3/50* (2006.01)

(52) U.S. Cl.
CPC ............... *F02C 7/10* (2013.01); *F23R 3/002* (2013.01); *F23R 3/005* (2013.01); *F01D 25/12* (2013.01); *F05D 2220/32* (2013.01); *F05D 2240/35* (2013.01); *F05D 2260/213* (2013.01); *F23R 3/286* (2013.01); *F23R 3/50* (2013.01); *F23R 7/00* (2013.01); *F23R 2900/03043* (2013.01)

(56) References Cited

U.S. PATENT DOCUMENTS

| | | | |
|---|---|---|---|
| 3,545,202 A | 12/1970 | Batt et al. | |
| 4,236,870 A | 12/1980 | Hucul, Jr. et al. | |
| 5,280,703 A | 1/1994 | Corrado et al. | |
| 5,513,489 A | 5/1996 | Bussing | |
| 5,680,767 A * | 10/1997 | Lee | F23R 3/005 415/115 |
| 6,250,061 B1 | 6/2001 | Orlando | |
| 6,679,062 B2 | 1/2004 | Conete et al. | |
| 7,089,748 B2 | 8/2006 | Tiemann | |
| 7,093,446 B2 | 8/2006 | Orlando et al. | |
| 7,562,519 B1 | 7/2009 | Harris et al. | |
| 7,748,211 B2 | 7/2010 | Norris et al. | |
| 7,784,265 B2 | 8/2010 | Rasheed et al. | |
| 7,921,635 B2 | 4/2011 | Suciu et al. | |
| 8,146,371 B2 | 4/2012 | Nordeen | |
| 9,556,794 B2 | 1/2017 | Falempin et al. | |
| 9,745,894 B2 | 8/2017 | Nilsson | |
| 2014/0373548 A1 * | 12/2014 | Hasselqvist | F23M 9/06 60/737 |
| 2015/0159555 A1 * | 6/2015 | Heinrich | F02C 7/224 60/726 |
| 2015/0377125 A1 | 12/2015 | Kupratis et al. | |
| 2016/0258625 A1 | 9/2016 | Maurer et al. | |
| 2018/0298770 A1 | 10/2018 | Devore et al. | |

* cited by examiner

COMBUSTION SECTION HEAT TRANSFER SYSTEM FOR A PROPULSION SYSTEM

CROSS-REFERENCE TO RELATED APPLICATIONS

The present application is a continuation of U.S. application Ser. No. 15/623,773 "Combustion Section Heat Transfer System for a Propulsion System" having a filing date of Jun. 15, 2017, and which is incorporated herein by reference in its entirety.

FIELD

The present subject matter relates generally to a system of heat transfer for a combustion section of a propulsion system.

BACKGROUND

Conventional combustion systems generally include a combustion chamber and turbine nozzle exposed to combustion gases downstream of the combustion chamber. Conventional propulsion systems and combustion sections generally remove an amount of air from the primary flowpath to provide cooling to the turbine nozzle to mitigate structural deterioration. The extracted air from the primary flowpath generally bypasses the combustion chamber. As such, propulsion systems must balance utilizing air from the primary flowpath for mitigating structural deterioration of the turbine nozzle with performance and efficiency losses due to removing air from mixture with a fuel for generating combustion gases.

Therefore, a combustion system is needed that mitigates structural deterioration of the turbine nozzle while minimizing or eliminating performance and efficiency losses due to utilizing air from the primary flowpath for heat transfer.

BRIEF DESCRIPTION

Aspects and advantages of the invention will be set forth in part in the following description, or may be obvious from the description, or may be learned through practice of the invention.

The present disclosure is directed to a propulsion system including an annular inner wall and an annular outer wall, a nozzle assembly, a turbine nozzle, and an inner casing and an outer casing. The inner wall and outer wall together extend at least partially along a longitudinal direction and together define a combustion chamber inlet, a combustion chamber outlet, and a combustion chamber therebetween. The nozzle assembly is disposed at the combustion inlet and provides a mixture of fuel and oxidizer to the combustion chamber. The turbine nozzle defines a plurality of airfoils in adjacent circumferential arrangement disposed at the combustion chamber outlet. The turbine nozzle is coupled to the outer wall and the inner wall. The inner casing is disposed inward of the inner wall and the outer casing is disposed outward of the outer wall. Each of the inner casing and the outer casing are coupled to the turbine nozzle. A primary flowpath is defined between the inner casing and the inner wall, through the turbine nozzle, and between the outer casing and the outer wall, and in fluid communication with the combustion chamber.

In one embodiment, the outer casing is further coupled to the inner wall.

In another embodiment, the outer wall, the inner wall, the turbine nozzle, the inner casing, and the outer casing are an integral structure.

In various embodiments, the primary flowpath defines an inner diameter (ID) primary flowpath between the inner wall and the inner casing, and an outer diameter (OD) primary flowpath between the outer wall and the outer casing. In one embodiment, the turbine nozzle defines a first cooling circuit within the plurality of airfoils. The first cooling circuit is in fluid communication with the primary flowpath.

In another embodiment, the turbine nozzle includes one or more cooling circuit walls defining the first cooling circuit.

In various embodiments, the first cooling circuit defines a first inlet opening in direct fluid communication with the ID primary flowpath. The first cooling circuit defines a first outlet opening in direct fluid communication with the OD primary flowpath.

In still another embodiment, the primary flowpath defines a second ID primary flowpath between the inner casing and the inner wall. The first cooling circuit defines a first inlet opening in direct fluid communication with the ID primary flowpath, and the first cooling circuit defines a first outlet opening in direct fluid communication with the second ID primary flowpath.

In yet another embodiment, the primary flowpath defines a second OD primary flowpath between the outer casing and the outer wall. The first cooling circuit defines a first inlet opening in direct fluid communication with the OD primary flowpath, and the first cooling circuit defines a first outlet opening in direct fluid communication with the second OD primary flowpath.

In still various embodiments, the turbine nozzle defines a second cooling circuit within the plurality of airfoils. The second cooling circuit is in direct fluid communication with one or more of the ID primary flowpath and the OD primary flowpath. In one embodiment, the second cooling circuit is disposed at a trailing edge of the plurality of airfoils. In another embodiment, the propulsion system defines a hot gas path downstream of the combustion chamber, in which the second cooling circuit is in direct fluid communication with the hot gas path.

In various embodiments, a channel structure is defined in one or more of the ID primary flowpath and the OD primary flowpath. The channel structure is in direct fluid communication with the first cooling circuit. In one embodiment, the channel structure comprises one or more channel walls extended at least along the longitudinal direction defining one or more cooling channels in fluid communication with the first cooling circuit and the primary flowpath. In another embodiment, the one or more channel walls are coupled to the one or more cooling circuit walls. The first cooling circuit is in direct fluid communication with the cooling channels.

In various embodiments, a heat exchanger is disposed within the primary flowpath. In one embodiment, the heat exchanger is disposed within one or more of an ID primary flowpath, a second ID primary flowpath, an OD primary flowpath, and a second OD primary flowpath.

In another embodiment, a support member is extended at least partially along the radial direction from one or more of the outer casing and the inner casing to one or more of the outer wall and the inner wall. In one embodiment, the support member defines a passage through which a flow of oxidizer from an upstream inlet section enters one or more of an inner diameter (ID) primary flowpath and an outer diameter (OD) primary flowpath.

In various embodiments, the outer wall, the inner wall, and nozzle assembly together define at least in part a rotating detonation combustion system.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
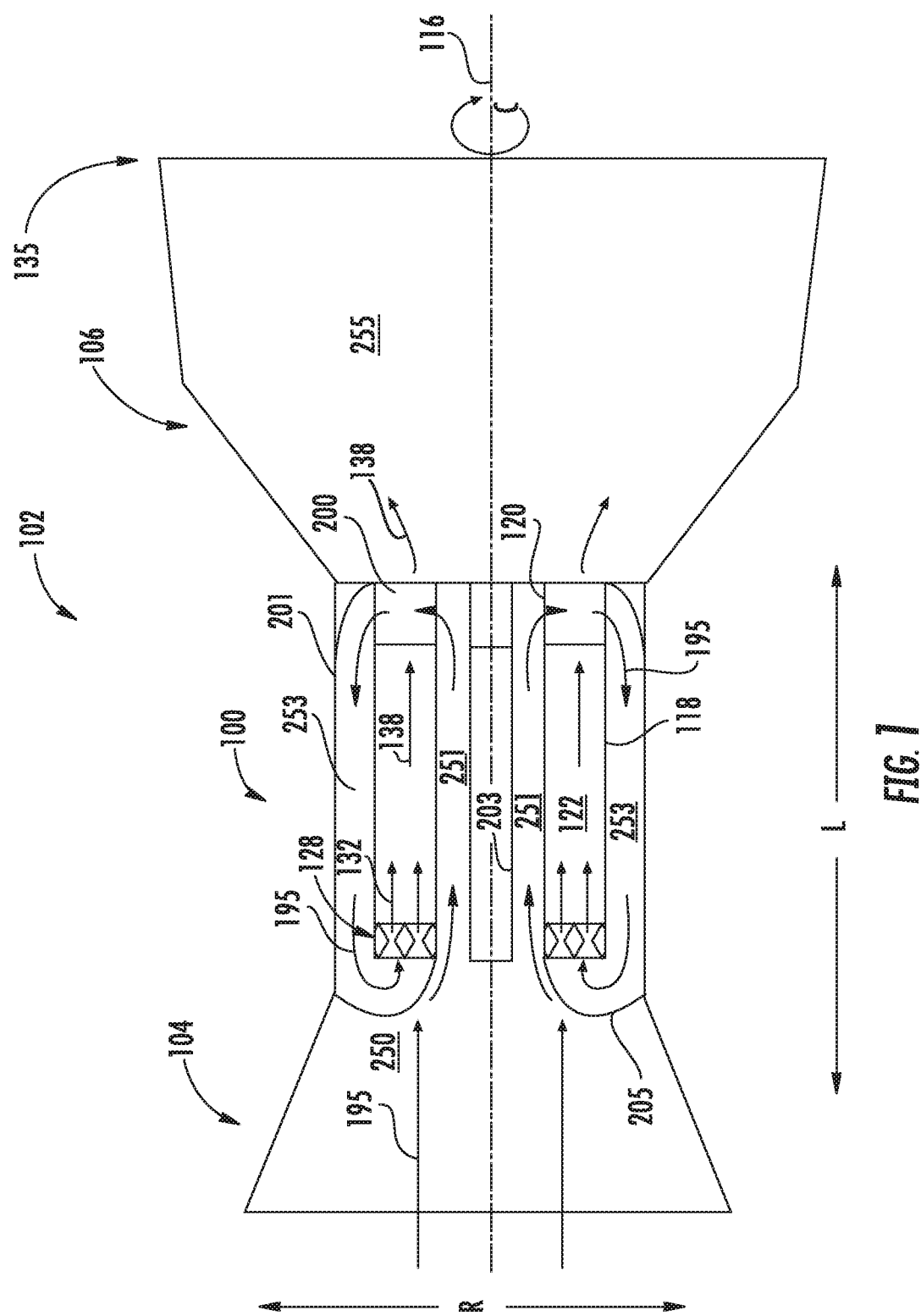
FIG. 1 is a schematic view of a propulsion system in accordance with an exemplary embodiment of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of a combustion system are generally provided that may mitigate structural deterioration of a turbine nozzle while minimizing or eliminating performance and efficiency losses due to utilizing an oxidizer from a primary flowpath for heat transfer. Various embodiments of the combustion system generally provided and described herein utilize regenerative cooling via a closed-loop arrangement of the oxidizer from an inlet section through a turbine nozzle and to a nozzle assembly and combustion chamber. In one embodiment, the combustion system defines a detonation combustion system, in which efficiency and performance may be further improved by decreasing or minimizing detonation cell size in the combustion chamber via the increased temperature of the oxidizer from the turbine nozzle.

Referring now to the figures, FIG. 1 depicts a propulsion system 102 including a combustion system 100 in accordance with an exemplary embodiment of the present disclosure. The propulsion system 102 generally includes an inlet section 104 and an outlet section 106, with the combustion system 100 located downstream of the inlet section 104 and upstream of the exhaust section 106. In various embodiments, the propulsion system 102 defines a gas turbine engine, a ramjet, or other propulsion system including a fuel-oxidizer burner producing combustion gases that provide propulsive thrust or mechanical energy output. In an embodiment of the propulsion system 102 defining a gas turbine engine, the inlet section 104 includes a compressor section defining one or more compressors generating an overall flow of oxidizer 195 to the combustion system 100. The inlet section 104 may generally guide a flow of the oxidizer 195 to the combustion system 100. The inlet section 104 may further compress the oxidizer 195 before it enters the combustion system 100. The inlet section 104 defining a compressor section may include one or more alternating stages of rotating compressor airfoils. In other embodiments, the inlet section 104 may generally define a decreasing cross sectional area from an upstream end to a downstream end proximate to the combustion system 100.

As will be discussed in further detail below, at least a portion of the overall flow of oxidizer 195 is mixed with a fuel to generate combustion gases 138. The combustion gases 138 flow downstream to the exhaust section 106. In various embodiments, the exhaust section 106 may generally define an increasing cross sectional area from an upstream end proximate to the combustion system 100 to a downstream end of the propulsion system 102. Expansion of the combustion gases 138 generally provides thrust that propels the apparatus to which the propulsion system 102 is attached, or provides mechanical energy to one or more turbines further coupled to a fan section, a generator, or both. Thus, the exhaust section 106 may further define a turbine section of a gas turbine engine including one or more alternating rows or stages of rotating turbine airfoils. The combustion gases 138 may flow from the exhaust section 106 through, e.g., an exhaust nozzle 135 to generate thrust for the propulsion system 102.

As will be appreciated, in various embodiments of the propulsion system 102 defining a gas turbine engine, rotation of the turbine(s) within the exhaust section 106 generated by the combustion gases 138 is transferred through one or more shafts or spools 110 to drive the compressor(s) within the inlet section 104. In various embodiments, the inlet section 104 may further define a fan section, such as for a turbofan engine configuration, such as to propel air across a bypass flowpath outside of the combustion system 100 and exhaust section 106.

It will be appreciated that the propulsion system 102 depicted schematically in FIG. 1 is provided by way of example only. In certain exemplary embodiments, the propulsion system 102 may include any suitable number of compressors within the inlet section 104, any suitable number of turbines within the exhaust section 106, and further may include any number of shafts or spools 110 appropriate for mechanically linking the compressor(s), turbine(s), and/or fans. Similarly, in other exemplary embodiments, the propulsion system 102 may include any suitable fan section, with a fan thereof being driven by the exhaust section 106 in any suitable manner. For example, in certain embodiments, the fan may be directly linked to a turbine within the exhaust section 106, or alternatively, may be driven by a turbine within the exhaust section 106 across a reduction gearbox. Additionally, the fan may be a variable pitch fan, a fixed pitch fan, a ducted fan (i.e., the propulsion system 102 may include an outer nacelle surrounding the fan section), an un-ducted fan, or may have any other suitable configuration.

Moreover, it should also be appreciated that the combustion system 100 may further be incorporated into any other suitable aeronautical propulsion system, such as a turboshaft engine, a turboprop engine, a turbojet engine, a ramjet engine, a scramjet engine, etc. Further, in certain embodiments, the combustion system 100 may be incorporated into a non-aeronautical propulsion system, such as a land-based or marine-based power generation system. Further still, in certain embodiments, the combustion system 100 may be incorporated into any other suitable propulsion system, such as a rocket or missile engine. With one or more of the latter embodiments, the propulsion system may not include a compressor in the inlet section 104 or a turbine in the exhaust section 106.

Referring now to FIGS. 1-6, the combustion system 100 generally includes an annular outer wall 118 and an annular inner wall 120 spaced from one another along the radial direction R and extended generally along the longitudinal direction L. The outer wall 118 and the inner wall 120 together define in part a combustion chamber inlet 124, a combustion chamber outlet 126, and a combustion chamber 122 therebetween.

The combustion system 100 further includes a nozzle assembly 128 disposed at the combustion chamber inlet 124. The nozzle assembly 128 provides a flow mixture of oxidizer 195 and a liquid or gaseous fuel (or combination thereof) to the combustion chamber 122, wherein such mixture (shown schematically as arrows 132) is combusted/detonated to generate combustion gases 138 therein. The combustion gases 138 then flow from the combustion chamber 122 downstream through the combustion chamber outlet 126 to the exhaust section 106.

The nozzle assembly 128 includes one or more nozzles 140. In one embodiment, the nozzle 140 defines an annular nozzle around the longitudinal centerline 116, in which the flow of oxidizer 195 passes across a generally converging-diverging nozzle wall of the nozzle 140. A plurality of fuel injection ports are defined in adjacent circumferential arrangement along the annulus of the nozzle 140 around the longitudinal centerline 116. The oxidizer 195 passes through the nozzle 140 and mixes with a liquid or gaseous fuel (or combination thereof).

In another embodiment, the nozzle 140 defines a plurality of nozzles (e.g., fuel injectors) disposed in adjacent arrangement along the circumferential direction C. The nozzle assembly 128 may include a plurality of discrete nozzles 140, each including a fuel injection port and nozzle flowpath through which the oxidizer 195 and fuel mixes.

In either embodiment, the nozzle assembly 128 may further define a plurality of nozzles 140 arranged in adjacent arrangement along the radial direction R. Each nozzle 140 of the nozzle assembly 128 may define a plurality of geometric structures specific to one or more operating conditions of the propulsion system (e.g., a power output, a pressure or temperature condition at the combustion system 100, etc.), or one or more structures attenuating pressure oscillations, pressure waves, acoustics, etc. from the combustion/detonation of the fuel/oxidizer mixture 132 in the combustion chamber 122.

Referring still to FIGS. 1-6, the combustion system 100 further includes a turbine nozzle 200 defining a plurality of airfoils 215 in adjacent arrangement along the circumferential direction C. The turbine nozzle 200 is disposed at the combustion chamber outlet 126. The turbine nozzle 200 is coupled to the outer wall 118 and the inner wall 120 of the combustion system 100. The turbine nozzle 200, or more specifically, the plurality of airfoils 215 of the turbine nozzle 200, is configured to accelerate a circumferential flow component of combustion gases 138 from the combustion chamber 122 to the exhaust section 106. For example, the exhaust section 106 may define a turbine section including one or more turbine rotors. The turbine nozzle 200 is configured to accelerate a circumferential flow component of the combustion gases 138 flowing generally along the longitudinal direction L such as to reduce a normal force of the combustion gases 138 on the turbine rotors downstream of the turbine nozzle 200.

The combustion system 100 further includes an inner casing 203 disposed inward of the inner wall 120 along the radial direction R and an outer casing 201 disposed outward of the outer wall 118 along the radial direction R. Each of the inner casing 203 and the outer casing 201 extend at least partially along the longitudinal direction L and define a generally annular structure around the longitudinal centerline 116. Each of the inner casing 203 and the outer casing 201 extend toward the turbine nozzle 200 and are each coupled thereto. For example, the inner casing 203 and the outer casing 201 are each coupled toward a downstream end of the turbine nozzle 200.

The propulsion system 102 defines a primary flowpath 250 through the inlet section 104, the combustion system 100, and the exhaust section 106. Within the combustion system 100, the primary flowpath 250 is defined between the inner casing 203 and inner wall 120, through the turbine nozzle 200, between the outer casing 201 and outer wall 118, and through the nozzle assembly 128 and between the outer wall 118 and inner wall 120 (i.e., through the combustion chamber 122).

Figure 2:
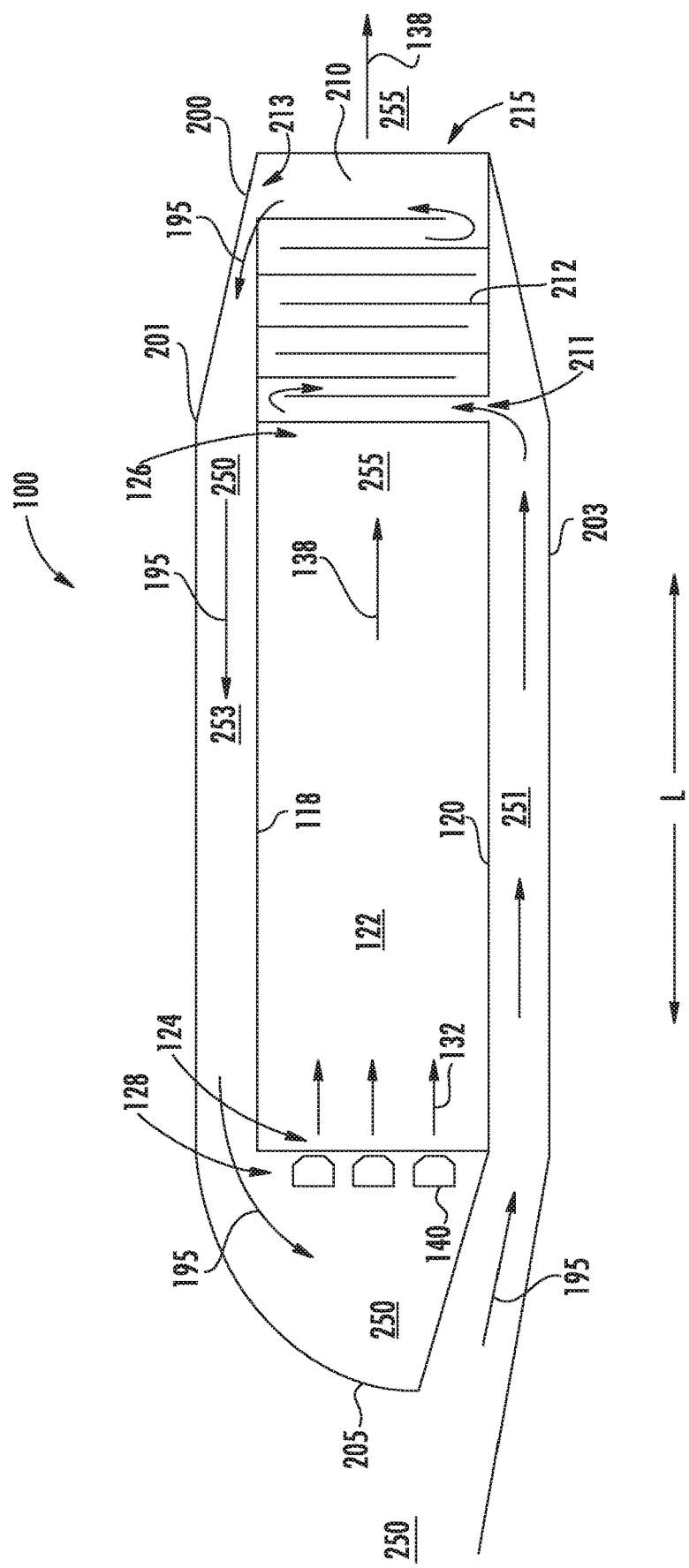
FIG. 2 is a cross sectional view of an exemplary embodiment of a combustion system of the propulsion system of FIG. 1.
Figure 3:
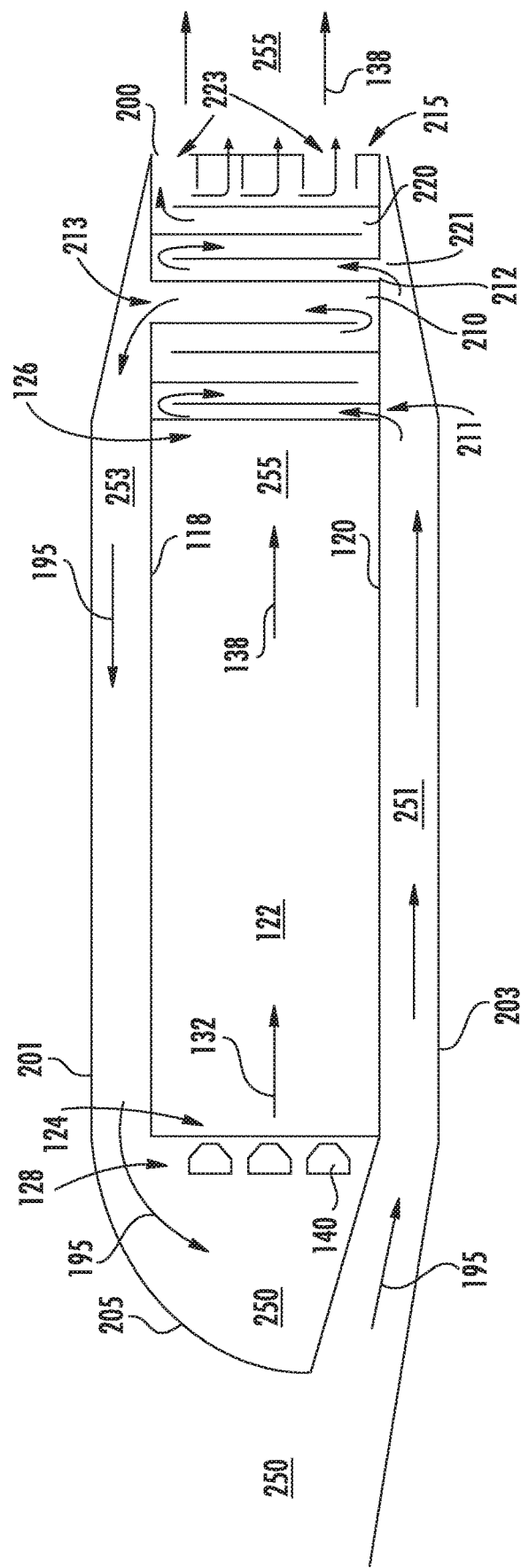
FIG. 3 is a cross sectional view of another exemplary embodiment of a combustion system of the propulsion system of FIG. 1.

During operation of the propulsion system 102, a flow of oxidizer 195 is ingested through the inlet section 104 and provided to the combustion system 100. The oxidizer 195 flows from an upstream end from the inlet section 104 through the primary flowpath 250 within the combustion system 100. Referring to FIGS. 1-3, the oxidizer 195, in serial order, flows through the primary flowpath 250 defined between the inner casing 203 and the inner wall 120, through the turbine nozzle 200 (e.g., through one or more passages defined within the plurality of airfoils 215 of the turbine nozzle 200), through the primary flowpath 250 between the outer casing 201 and the outer wall 118, through the nozzle assembly 128 and combustion chamber 122, then egressing the combustion system 100 into the exhaust section 106 across the turbine nozzle 200. As the oxidizer 195 flows through the nozzle assembly 128, it is then mixed with a fuel and ignited within the combustion chamber 122 to generate combustion gases 138. As such, the combustion system 100 may minimize or eliminate a portion of oxidizer utilized exclusively for cooling (i.e., minimize or eliminate a portion of oxidizer removed from mixing with fuel and generation of combustion gases).

The flow of oxidizer 195 through the primary flowpath 250 as described herein provides convective cooling of the combustion system 100, including the outer wall 118, the inner wall 120, and the turbine nozzle 200. The primary flowpath 250 providing convective cooling of the combustion system 100 may improve combustion system 100 durability and efficiency, and improve turbine nozzle 200 durability.

Referring now to FIG. 2, a cross sectional view of an exemplary embodiment of the combustion system 100 is generally provided. In various embodiments, the outer casing 201 is coupled to the inner wall 120. For example, the outer casing 201 or inner casing 120 may include a support member 205 extended at least partially along the radial direction R. The support member 205 may define a curve or contoured structure (e.g., a dome, wall, vane, etc.) configured to direct the flow of oxidizer 195 toward the primary flowpath 250 through the combustion system 100, such as between the inner casing 203 and the inner wall 120.

The primary flowpath 250 through the combustion system 100 may further define an inner diameter (ID) primary flowpath 251 between the inner wall 120 and the inner casing 203 and an outer diameter (OD) primary flowpath 253 between the outer wall 118 and the outer casing 201.

In one embodiment of the combustion system 100, such as generally provided in FIG. 2, the turbine nozzle 200 defines a first cooling circuit 210 within the plurality of airfoils 215. The first cooling circuit 210 is defined by one or more cooling circuit walls 212 extended within the plurality of airfoils 215. The one or more cooling circuit walls 212 defines the first cooling circuit 210 as one or more channels extended generally at least along a radial direction R within the turbine nozzle 200. However, it should be appreciated that in other embodiments, cooling circuit walls 212 may define the first cooling circuit 210 along the longitudinal direction L, in a serpentine structure, or further at least partially along a circumferential direction, etc.

The first cooling circuit 210 is in fluid communication with the primary flowpath 250. In one embodiment, such as generally provided in FIG. 2, the first cooling circuit 210 defines a first inlet opening 211 in direct fluid communication with the ID primary flowpath 251 and a first outlet opening 213 in direct fluid communication with the OD primary flowpath 253. The first inlet opening 211 adjacent to the ID primary flowpath 251 enables a flow of oxidizer 195 to enter from the inlet section 104 through the ID primary flowpath 251 into the first cooling circuit 210 through the plurality of airfoils 215 of the turbine nozzle 200. The first outlet opening 213 adjacent to the OD primary flowpath 253 enables the flow of oxidizer 195 to egress from the first cooling circuit 210 through the OD primary flowpath 253 and through the nozzle assembly 128 and into the combustion chamber 122. The flow of oxidizer 195 as described herein enables heat transfer to the oxidizer 195 such as to provide cooling to the inner wall 120, the turbine nozzle 200, and the outer wall 118.

Referring now to FIG. 3, a cross sectional view of another exemplary embodiment of the combustion system 100 is generally provided. The combustion system 100 shown in FIG. 3 may be configured substantially similarly as described in regard to FIG. 2. However, the embodiment provided in FIG. 3 further defines a second cooling circuit 220 within the plurality of airfoils 215 of the turbine nozzle 200. The second cooling circuit 220 is defined by one or more of the cooling circuit walls 212 within the plurality of airfoils 215.

The second cooling circuit 220 defines a second inlet opening 221 in direct fluid communication with the ID primary flowpath 251 and a second outlet opening 223 in direct fluid communication with a hot gas path 255. The hot gas path 255 is defined as the portion of the primary flowpath 250 downstream of the nozzle assembly 128, such as at and downstream of a combustion/detonation of the fuel/oxidizer mixture 132 within the combustion chamber 122. The second inlet opening 221 adjacent to the ID primary flowpath 251 enables a flow of oxidizer 195 to enter from the inlet section 104 through the ID primary flowpath 251 into the first cooling circuit 210 and the second cooling circuit 220 through the plurality of airfoils 215 of the turbine nozzle 200. The second outlet opening 223 adjacent to the hot gas path 255 enables the flow of oxidizer 195 to egress from the second cooling circuit 220.

In various embodiments, the second cooling circuit 220 is disposed at a trailing edge of the plurality of airfoils 215 (e.g., a downstream end of the plurality of airfoils 215).

Figure 4:
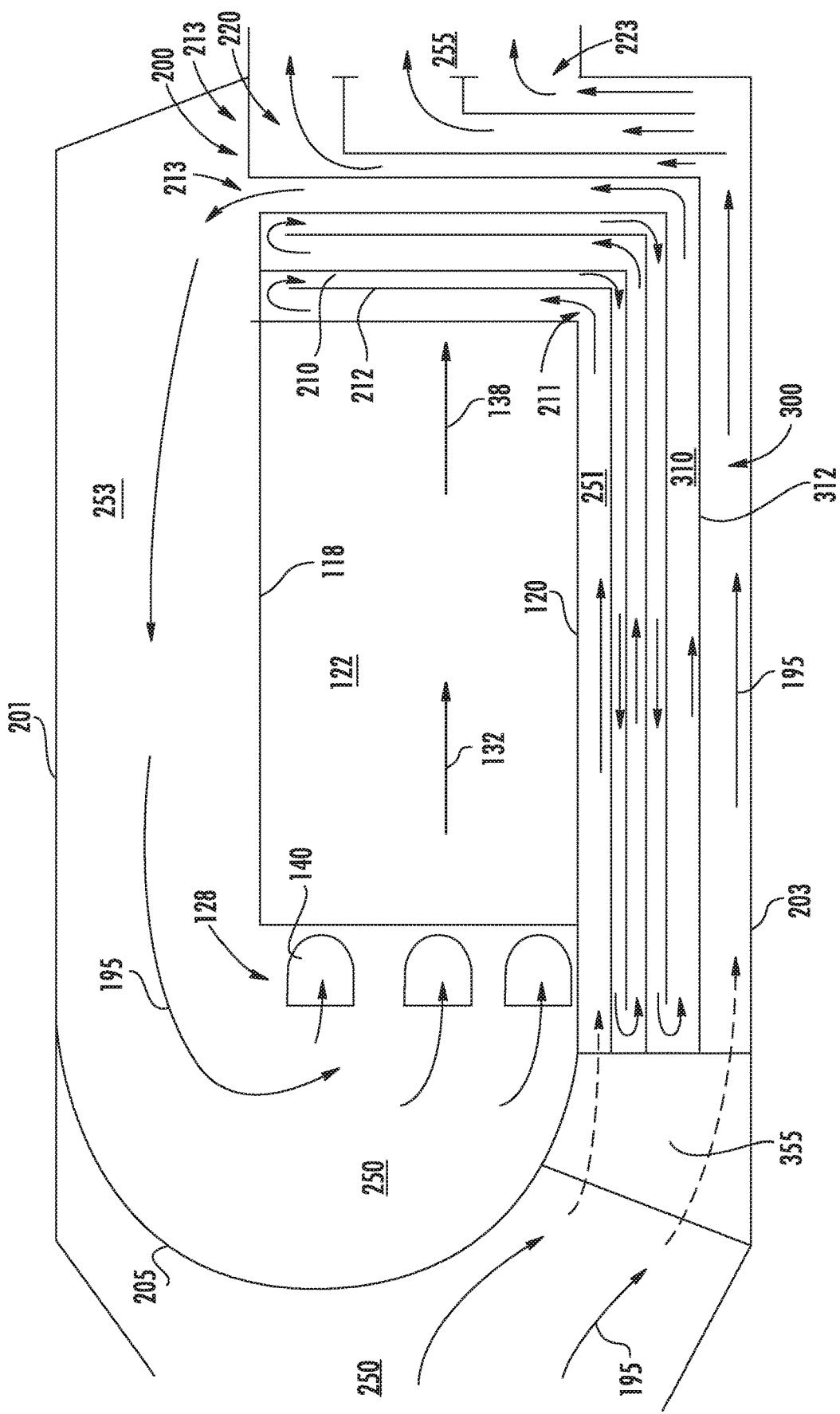
FIG. 4 is a cross sectional view of yet another exemplary embodiment of a combustion system of the propulsion system of FIG. 1.

Referring now to FIG. 4, a cross sectional view of yet another exemplary embodiment of the combustion system 100 is generally provided. The combustion system shown in FIG. 4 may be configured substantially similarly as described in regard to FIGS. 2-3. However, the embodiment provided in FIG. 4 further defines a channel structure 300 within the primary flowpath 200 in direct fluid communication with the first cooling circuit 210 of the turbine nozzle 200. The channel structure 300 includes one or more channel walls 312 defining one or more cooling channels 310 within the channel structure 300. As shown in FIG. 4, the channel walls 312 may extend at least partially along the longitudinal direction L. In various embodiments, the channel walls 312 are coupled to the cooling circuit walls 212 of the turbine nozzle 200. As such, the one or more cooling channels 310 defined by the channel structure 300 are in direct fluid communication with the one or more passages of the first cooling circuit 210.

In one embodiment, such as generally provided in FIG. 4, the channel structure 300 is disposed in the ID primary flowpath 251 between the inner casing 203 and the inner wall 120. In another embodiment, such as generally provided in FIG. 5, the channel structure 300 is disposed in the OD primary flowpath 253 between the outer casing 201 and the outer wall 118. Furthermore, in reference to FIG. 5, the channel structure 300 is disposed in the ID primary flowpath 251 and the OD primary flowpath 253, each in direct fluid communication with the first cooling circuit 210. Although not depicted, in other embodiments the channel structure 300 may be disposed solely in the OD primary flowpath 253.

During operation of the propulsion system 102, the combustion system 100 enables heat transfer from the turbine nozzle 200 and the inner wall 120, outer wall 118, or both. The generally cooler flow of oxidizer 195 from the inlet section 104 through the combustion section 100 enables heat transfer from the generally hot outer wall 118, inner wall 120, and turbine nozzle 200 to the flow of oxidizer 195. The channel structure 300, including the channel walls 312, and the first cooling circuit 210, including the cooling circuit walls 212, enable dissipation of heat from the flow of oxidizer 195 as it passes through the cooling channels 310 and the first cooling circuit 210.

The embodiments of the combustion system 100 generally provided enable utilization of the flow of oxidizer 195 to cool the turbine nozzle 200, the outer wall 118, and the inner wall 120 while further utilizing the oxidizer 195 for combustion/detonation within the combustion chamber 122 while minimizing or eliminating thermodynamic and efficiency losses that generally result from utilizing the oxidizer for cooling rather than combustion/detonation.

Figure 5:
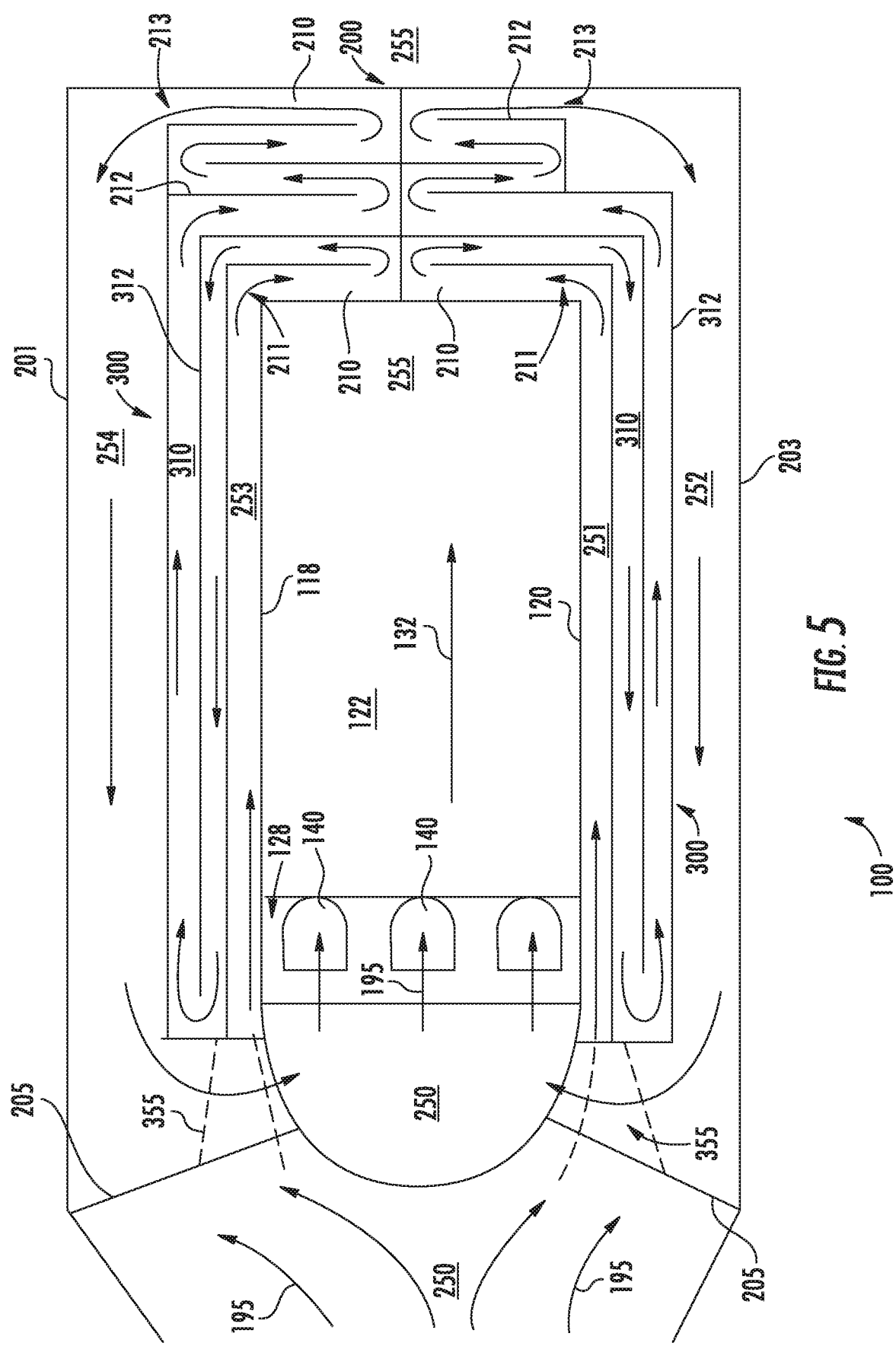
FIG. 5 is a cross sectional view of still another exemplary embodiment of a combustion system of the propulsion system of FIG. 1.

Referring now to FIG. 5, a cross sectional view of another exemplary embodiment of the combustion system 100 is generally provided. The combustion system 100 shown in FIG. 5 may be configured substantially similarly as described in regard to FIGS. 2-4. However, in FIG. 5, as previously described, the channel structure 300 is disposed within the ID primary flowpath 251 and the OD primary flowpath 253. The combustion system 100 defines a second ID primary flowpath 252 between the channel structure 300 and the inner casing 203. The combustion system 100 further defines a second OD primary flowpath 254 between the channel structure 300 and the outer casing 201.

Referring still to FIG. 5, the first cooling circuit 210 defines the first inlet opening 211 in direct fluid communication with the OD primary flowpath 253 and at least another of the first inlet opening 211 in direct fluid communication with the second ID primary flowpath 252. The first cooling circuit 210 further defines the first outlet opening 213 in direct fluid communication with the ID primary flowpath 251 and at least another of the first outlet opening 213 in direct fluid communication with the second OD primary flowpath 254.

The first inlet opening 211 adjacent to the ID primary flowpath 251 enables a flow of oxidizer 195 to enter from the inlet section 104 through the ID primary flowpath 251 into the first cooling circuit 210 through the plurality of airfoils 215 of the turbine nozzle 200, and through the first outlet opening 213 adjacent to the second ID primary flowpath 252. The first inlet opening 211 adjacent to the OD primary flowpath 253 enables a flow of oxidizer 195 to enter from the inlet section 104 through the OD primary flowpath 253 into the first cooling circuit 210 through the plurality of airfoils 215 of the turbine nozzle 200, and through the first outlet opening 213 adjacent to the second OD primary flowpath 254.

The combustion system 100 may further define a support member 205 extended from the outer wall 118 to the outer casing 201. In various embodiments, combustion system 100 defines the support member 205 extended from the inner wall 120 to the inner casing 203. The support member 205 may define one or more passages 355 through which a flow of oxidizer 195 from the inlet section 104 enters the ID primary flowpath 251, the OD primary flowpath 253, or both. The support member 205 further defines a wall extended from the outer casing 201 to the outer wall 118, or from the inner casing 203 to the inner wall 120, or both, in which the wall fluidly segregates the flow of oxidizer 195 from the inlet section 104 from direct fluid communication with the second ID primary flowpath 252 and the second OD primary flowpath 254. The wall defined by the support member 205 further fluidly segregates the flow of oxidizer 195 egressing the first cooling circuit 210 to the nozzle assembly 128 from direct fluid communication with flow of oxidizer 195 at the primary flowpath 250 upstream of the ID primary flowpath 251 and OD primary flowpath 253.

Figure 6:
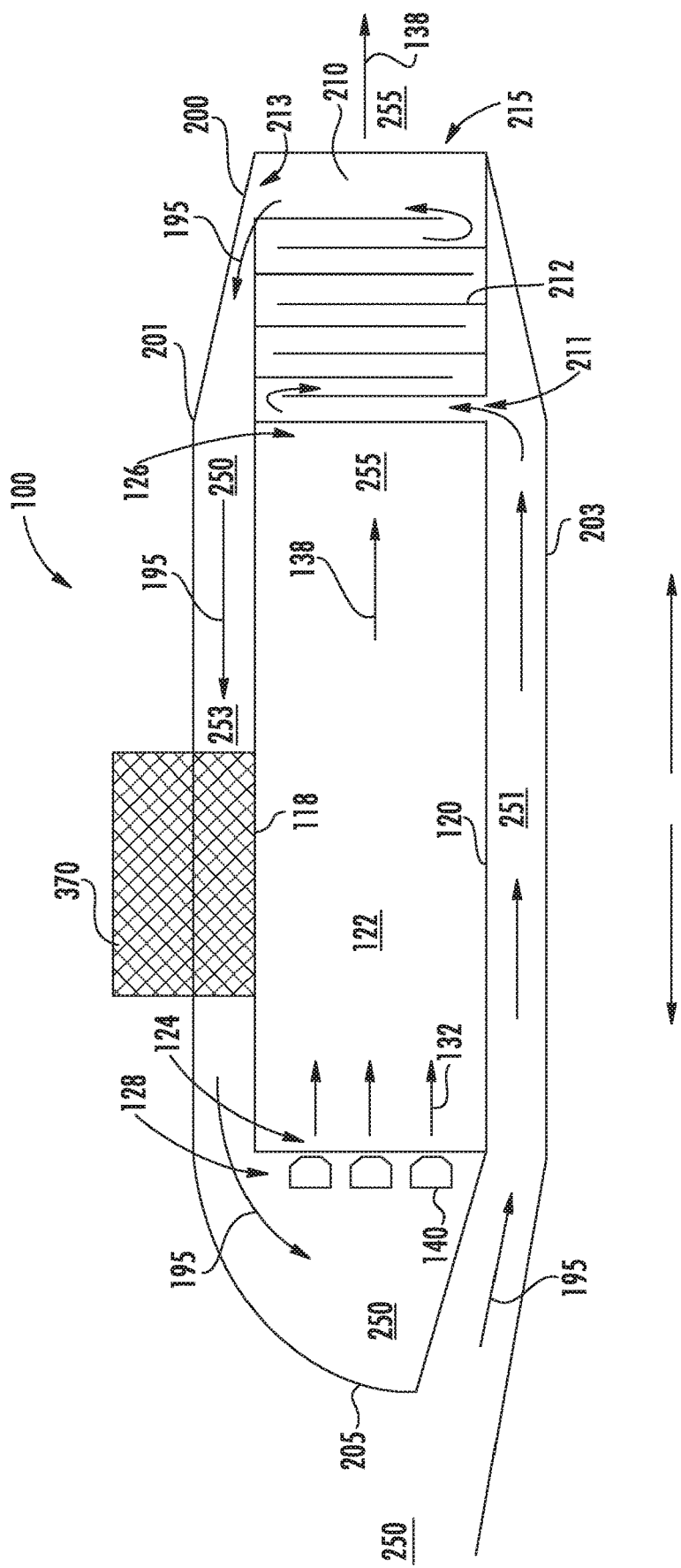
FIG. 6 is a cross sectional view of still yet another exemplary embodiment of a combustion system of the propulsion system of FIG. 1.

Referring now to FIG. 6, a cross sectional view of a combustion system 100 is generally provided. The combustion system 100 may be configured substantially similarly as described in regard to FIGS. 2-5. However, in FIG. 6, the combustion system 100 further includes a heat exchanger 370 disposed within the primary flowpath 250. In the embodiment generally provided in FIG. 6, the heat exchanger 370 is disposed within the primary flowpath 250 between the outer casing 201 and the outer wall 118. In other embodiments, the heat exchanger 370 may be disposed within the primary flowpath 250 between the inner casing 203 and the inner wall 120. In various embodiments, the heat exchanger may be disposed within one or more of the ID primary flowpath 251, the second ID primary flowpath 252, the OD primary flowpath 253, and the second OD primary flowpath 254.

The heat exchanger 370 may include a plurality of fins, plates, walls, tubes or manifolds, or combinations thereof through and to which the oxidizer 195 transfers heat. In one embodiment, such as generally provided in FIG. 6, the heat exchanger 370 is disposed within the primary flowpath 250 downstream of the first cooling circuit 210 (e.g., at the OD primary flowpath 253, the second OD primary flowpath 254, or the second ID primary flowpath 252). One or more of the turbine nozzle 200, the outer wall 118, and the inner wall 120 transfers thermal energy to the oxidizer 195 as it flows through the primary flowpath 250 from the inlet section 104 through the turbine nozzle 200. The oxidizer 195 transfer thermal energy to the heat exchanger 370, thereby cooling the oxidizer 195, before entering the nozzle assembly 128 and mixing with a liquid or gaseous fuel for combustion/detonation in the combustion chamber 122.

In other embodiments, the heat exchanger 370 may be disposed within the primary flowpath 250 upstream of the first cooling circuit 210 (e.g., at the ID primary flowpath 251 or the OD primary flowpath 253). In still various embodiments, the heat exchanger 370 defines a cooling conduit, including an inlet and an outlet each in direct fluid communication with the primary flowpath 250, through which the oxidizer 195 flows.

In various embodiments, the heat exchanger 370 includes one or more heat transfer fluids, such as, but not limited to, air, an inert gas, the liquid or gaseous fuel (or combination thereof), oil, lube, or hydraulic fluid, or a liquid or gaseous refrigerant.

Referring now to FIGS. 1-6, various embodiments of the combustion system 100 may further define a detonation combustion system, such as a rotating detonation combustion system. For a combustion system 100 defining a rotating detonation combustion system, the increased temperature of the oxidizer 195 from the turbine nozzle 200 to the nozzle assembly 128 improves detonation by improving liquid fuel vaporization when mixed with the oxidizer 195. The combustion system 100 further improves detonation by decreasing or minimizing detonation cell size in the combustion chamber 100 via the increased temperature of the oxidizer 195.

In still various embodiments, the combustion system 100 defines an integral structure. For example, one or more of the outer wall 118, the inner wall 120, the turbine nozzle 200, the inner casing 203, and the outer casing 201 may together define an integral structure. The combustion system 100, or portions thereof, may be manufactured using one or more additive manufacturing, machining, welding, joining, and bonding processes. The combustion system 100 may be formed of one or more materials suitable of propulsion system hot sections (e.g., combustion and turbine sections), including, but not limited to, steel, nickel, aluminum, or alloys of each, or a ceramic matrix composite, or combinations thereof.

The embodiments of the combustion system 100 generally provided and described herein utilize regenerative cooling via a closed-loop arrangement of the oxidizer 195 from the inlet section 104 through the turbine nozzle 200 and to the nozzle assembly 128 and combustion chamber 122. The combustion system 100 further improves propulsion system 102 efficiency and durability by minimizing the amount of oxidizer 195 removed from combustion/detonation and utilized for turbine nozzle cooling 200. Furthermore, the combustion system 100 improves propulsion system 102 structural life and decreases costs by minimizing deterioration of the turbine nozzle 200.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A propulsion system comprising:
   an annular inner wall and an annular outer wall, wherein the inner wall and the outer wall extend at least partially along a longitudinal direction and together define a combustion chamber therebetween, and wherein the inner wall and the outer wall together define, in part, a combustion chamber inlet and a combustion chamber outlet;
   a nozzle assembly disposed at the combustion chamber inlet, the nozzle assembly configured to provide a fuel and oxidizer mixture to the combustion chamber;
   a turbine nozzle coupled between the inner wall and the outer wall and positioned at the combustion chamber outlet, wherein the turbine nozzle defines a cooling circuit within the turbine nozzle;
   an inner casing disposed radially inward of the inner wall and an outer casing disposed radially outward of the outer wall, wherein each of the inner casing and the outer casing are coupled to the turbine nozzle; and
   a channel structure including a channel wall extending along the longitudinal direction and defining a first flowpath between the combustion chamber and the channel wall, wherein a second flowpath is defined between the channel structure the inner casing or the outer casing,
   wherein a primary flowpath is defined from the first flowpath to the cooling circuit to the second flowpath to the nozzle assembly then into the combustion chamber.

2. The propulsion system of claim 1, wherein the first flowpath is in direct fluid communication with an inlet opening formed at the cooling circuit.

3. The propulsion system of claim 1, wherein the second flowpath is in direct fluid communication with an outlet opening formed at the cooling circuit.

4. The propulsion system of claim 1, wherein the channel structure comprises a plurality of channel walls each extending along the longitudinal direction.

5. The propulsion system of claim 1, wherein the propulsion system is configured to provide a flow of oxidizer through the primary flowpath.

6. The propulsion system of claim 1, wherein the channel structure is a first channel structure and the second flowpath is defined between the first channel structure and the inner casing,
   wherein the propulsion system comprises a second channel structure including a second channel wall extending along the longitudinal direction and defining a third flowpath between the combustion chamber and the second channel wall, wherein a fourth flowpath is defined between the second channel structure the outer casing, and
   wherein a second primary flowpath is defined from the third flowpath to a second cooling circuit of the turbine nozzle to the fourth flowpath to the nozzle assembly then into the combustion chamber.

7. The propulsion system of claim 1, wherein the cooling circuit comprises an inlet opening in direct fluid communication with the first flowpath, and wherein the cooling circuit comprises an outlet opening in direct fluid communication with the second flowpath.

8. The propulsion system of claim 6, wherein the first cooling circuit comprises an inner inlet opening positioned in fluid communication with the first flowpath, and wherein the cooling circuit comprises an inner outlet opening positioned in fluid communication with the second flowpath.

9. The propulsion system of claim 6, wherein the second cooling circuit comprises an outer inlet opening positioned in fluid communication with the third flowpath, and wherein the cooling circuit comprises an outer outlet opening positioned in fluid communication with the fourth flowpath.

10. The propulsion system of claim 6, wherein the first cooling circuit comprises an inner inlet opening positioned in fluid communication with the first, and wherein the first cooling circuit comprises an inner outlet opening positioned in fluid communication with the second flowpath, and wherein the second cooling circuit comprises an outer inlet opening positioned in fluid communication with the third flowpath, and wherein the second cooling circuit comprises an outer outlet opening positioned in fluid communication with the fourth flowpath.

11. The propulsion system of claim 1, the propulsion system comprising a heat exchanger positioned in thermal communication with the second flowpath.

12. The propulsion system of claim 1, the propulsion system comprising a support member extended from the inner wall to the inner casing or from the outer wall to the outer casing.

13. The propulsion system of claim 12, wherein the support member forms a passage through which a flow of oxidizer is provided to the primary flowpath.

14. The propulsion system of claim 12, wherein the support member comprises a support member wall fluidly segregating a flow of oxidizer to the first flowpath from the flow of oxidizer in the second flowpath.

15. The propulsion system of claim 12, wherein the support member fluidly segregates a flow of oxidizer at the nozzle assembly from the flow of oxidizer from an inlet section.

16. The propulsion system of claim 1, wherein the inner wall, the outer wall and the nozzle assembly together at least partially form a rotating detonation combustion system.

* * * * *